United States Patent
Terito, Jr. et al.

[11] Patent Number: 5,941,287
[45] Date of Patent: Aug. 24, 1999

[54] REMOVABLE REUSABLE PIPE INSULATION SECTION

[75] Inventors: Samuel Joseph Terito, Jr., Baton Rouge; Michael Wayne Britt, Denham Springs; Grace Richard Crain; Christopher Scott Schaffer, both of Baton Rouge, all of La.

[73] Assignee: Corick, Inc., Baton Rouge, La.

[21] Appl. No.: 08/662,354

[22] Filed: Jun. 12, 1996

[51] Int. Cl.[6] .................................... F16L 9/14
[52] U.S. Cl. ......................... 138/149; 138/167; 138/168
[58] Field of Search .................... 138/149, 167, 138/168, 169

[56] References Cited

U.S. PATENT DOCUMENTS

| | | |
|---|---|---|
| 2,705,208 | 3/1955 | Schweikert . |
| 2,985,552 | 5/1961 | Watanabe . |
| 3,455,336 | 7/1969 | Ellis ........................................ 138/156 |
| 3,556,158 | 1/1971 | Schneider ............................... 138/156 |
| 3,906,129 | 9/1975 | Damois . |
| 3,941,159 | 3/1976 | Toll . |
| 4,039,098 | 8/1977 | Stilts . |
| 4,142,565 | 3/1979 | Plunkett, Sr. . |
| 4,181,765 | 1/1980 | Harmony . |
| 4,207,918 | 6/1980 | Burns et al. . |
| 4,259,981 | 4/1981 | Busse ...................................... 138/149 |
| 4,273,161 | 6/1981 | McLauglin . |
| 4,457,068 | 7/1984 | Maier, Jr. . |
| 4,556,082 | 12/1985 | Riley et al. . |
| 4,590,108 | 5/1986 | Nippe . |
| 4,642,253 | 2/1987 | Rüoff-Schäfer . |
| 4,807,669 | 2/1989 | Prestidge, Sr. . |
| 4,830,060 | 5/1989 | Botsolas ................................. 138/149 |
| 4,946,732 | 8/1990 | Cohen et al. . |
| 5,025,836 | 6/1991 | Botsolas . |
| 5,055,334 | 10/1991 | Lechuga ................................. 138/149 |
| 5,104,701 | 4/1992 | Cohen et al. . |
| 5,161,580 | 11/1992 | Klug . |
| 5,183,299 | 2/1993 | Hallerstrom et al. . |
| 5,522,433 | 6/1996 | Nygaard ................................. 138/149 |

OTHER PUBLICATIONS

Armstrong Insulation Products, Armstrong World Industries, Inc., Jan. 1995.
Rubatex Flexible Tubing, Sheet and Roll Insulations, Rubatex Corp., Nov. 1993.

*Primary Examiner*—Patrick Brinson
*Assistant Examiner*—James F. Hook
*Attorney, Agent, or Firm*—Roy, Kiesel & Tucker, PLC

[57] ABSTRACT

A removable reusable insulating unit suitable for insulating exposed pipe sections forming components of an insulated pipe system, the unit having a hollow body constructed of an insulating material which is capable of being easily cut the hollow body defining an interior and an exterior of the insulating unit, the interior sized to envelop an exposed pipe section on an insulated pipe system, the body having at least two pipe receptor areas, each sized to accommodate a component of an insulated pipe system.

16 Claims, 5 Drawing Sheets

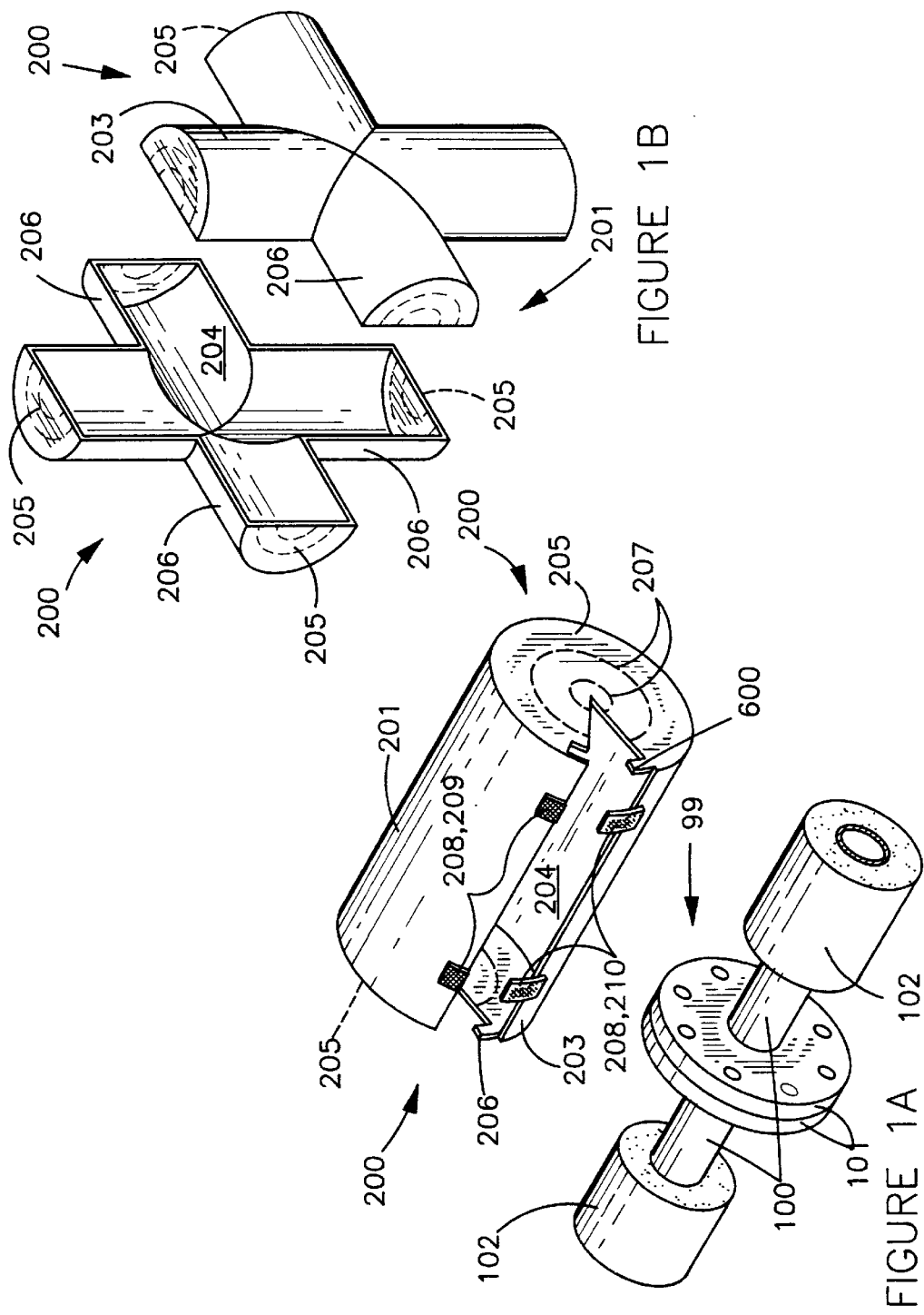

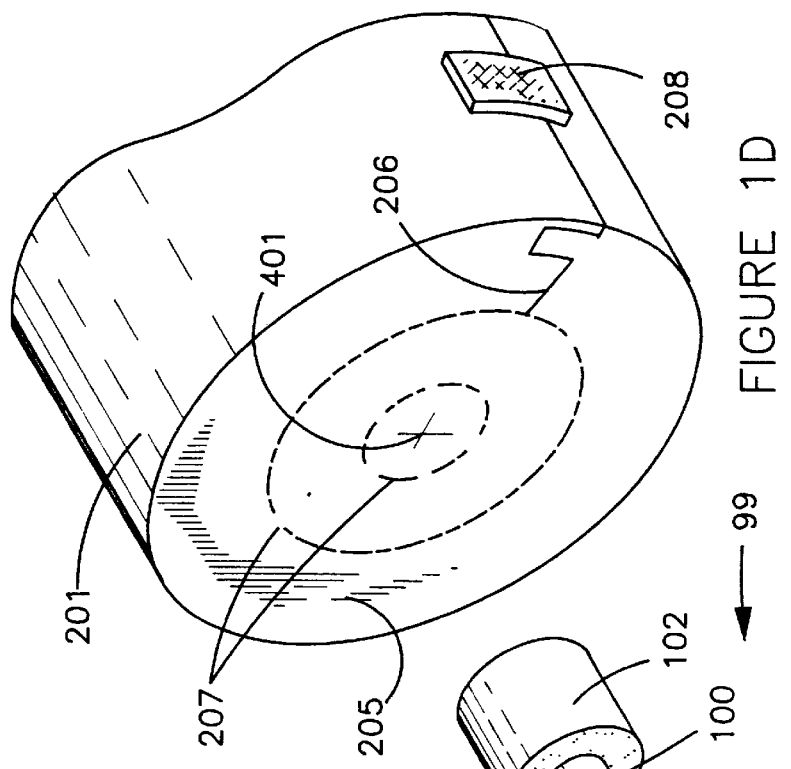
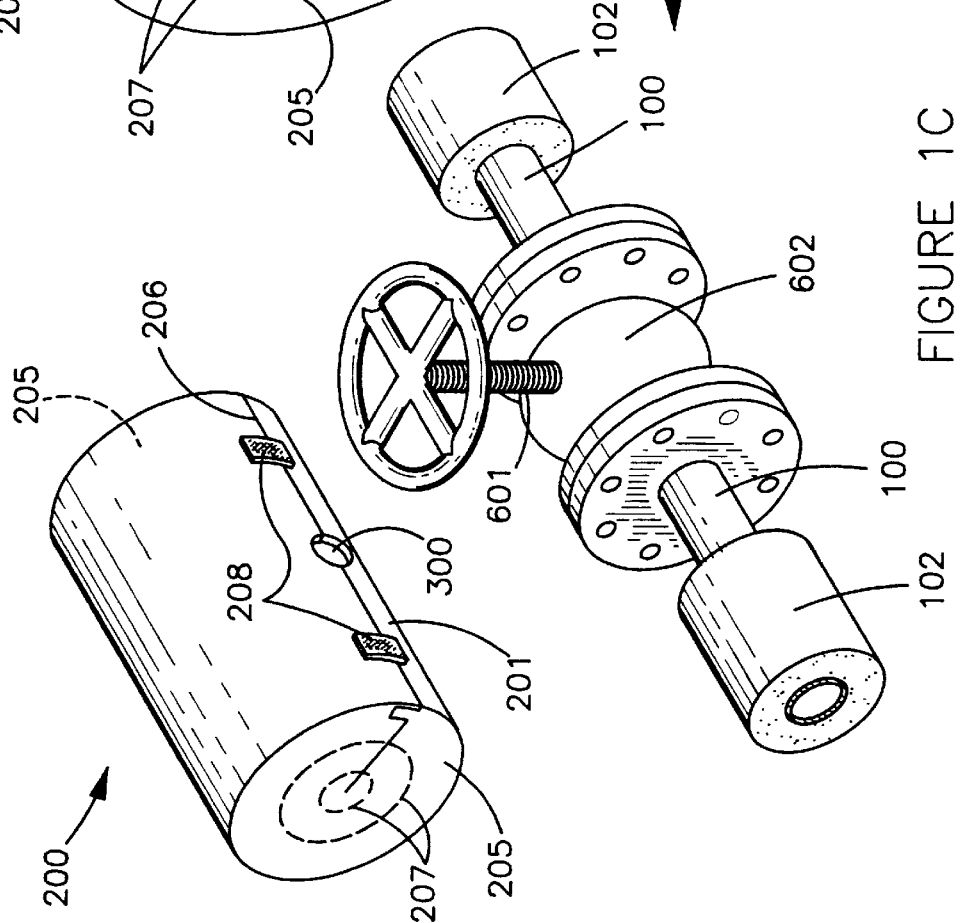

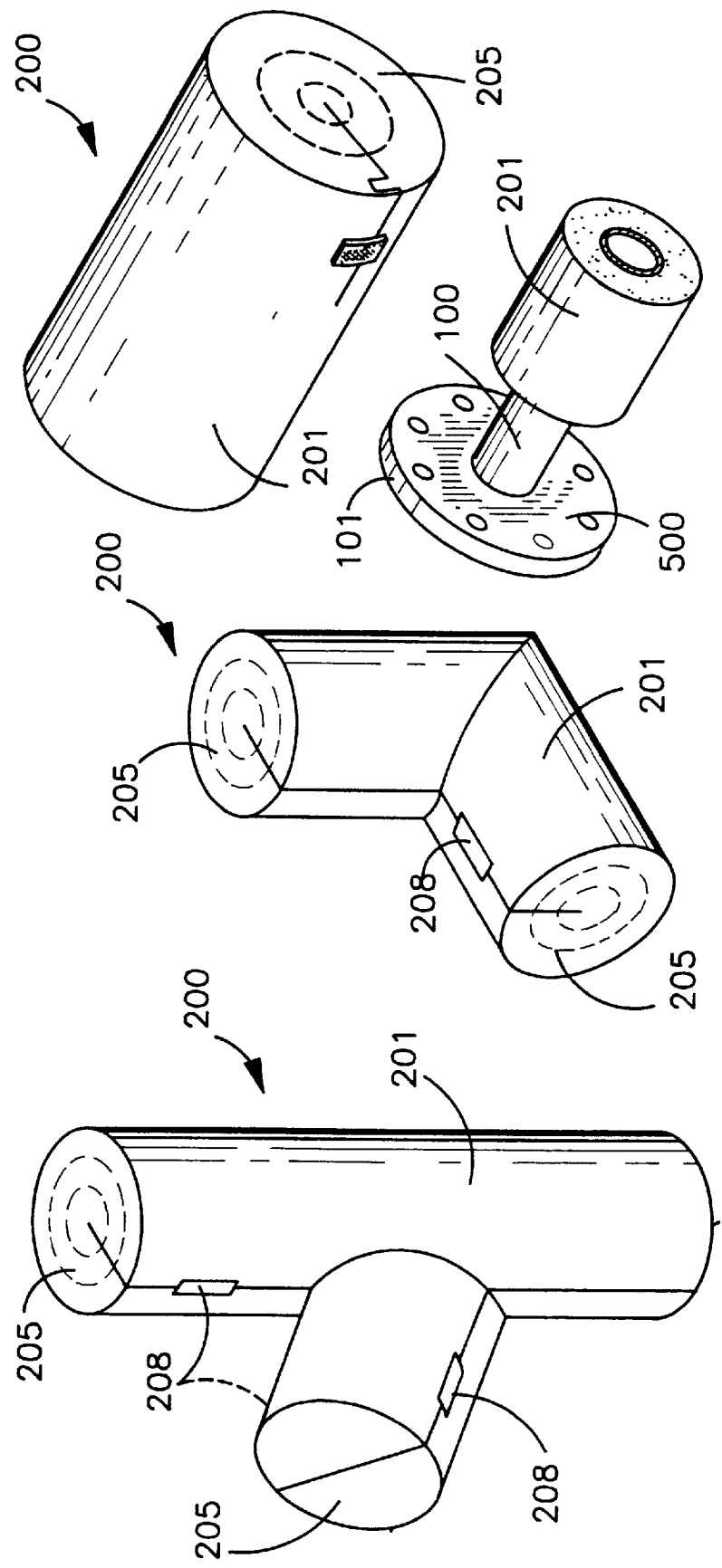

REMOVABLE REUSABLE PIPE INSULATION SECTION

BACKGROUND OF THE INVENTION

1. Field of the Invention

This invention pertains to insulation for pipes, more particularly, to removable and reusable insulation units.

2. Prior Art

Piping systems are designed to carry a variety of fluids, some of which may be chilled, such as a cold water piping system, and some of which may be heated, such as a hot water system or a steam piping system. When the fluid transported is at a different temperature that the ambient environment, it is desirable to insulate the piping system to maintain the temperature of the fluid being piped, and to reduce the overall energy losses. Insulation of such piping systems have included wrapping the systems in insulation, or encasing the system in a sheet metal or plastic housing with insulating material disposed therein. However, if the piping system needs maintenance, such as on a valve, connector or such, the insulating material must be removed from the section requiring maintenance. In conventional pipe insulation systems, removal of the insulating material destroys the useability of the removed material, requiring installation of new materials, a costly and time consuming process. Thus it is desirable to have a reusable removable insulating unit which can be used in new piping system installations or to retrofit sections of existing piping systems requiring maintenance.

Attempts to overcome the necessity of destroying the insulation over the section requiring repair have included removable insulation units having release fasteners, are shown in U.S. Pat. No. 3,941,159 for insulating straight pipe sections, and U.S. Pat. Nos. 4,207,918 and 4,807,669 for insulating complex shapes, such as for valve fittings, couplings, elbow, T or Y joints, or the like.

U.S. Pat. No. 3,941,159 discloses wrapping a pipe section in an insulating material, and using "Velcro" type fasteners. The patent also discloses using a vapor barrier liner attached to the insulating material to prevent condensation on the units. However, the insulating units described in this patent effectively insulate only a single diameter pipe, or pipe with associated insulation. For instance, U.S. Pat. No. 3,941,159 discloses a tubular insulating member having openings at the ends of the tube for allowing the pipe to exit. The opening in the insulating unit, as a prefabricated unit, will accommodate a particular sized pipe. A given unit is thus only useful on a given pipe, resulting in the need to stockpile a large quantity of varying sized insulating units. Additionally, replacement insulating units for exposed sections of pipe are designed to be installed so that the insulating unit overlaps non-exposed sections of pipe. In this instance, the pre-fabricated opening in the insulating unit must account for the expected thickness of existing pipe insulation (sometimes called insulating wrap or pipe collar). Because the thickness of insulation applied to a piping system can vary from system to system, indeed within the same piping system, a tube opening of fixed diameter might not accommodate the area to be joined.

U.S. Pat. Nos. 4,207,918 and 4,807,669 disclose insulating units for complex devices. The device shown in 4,207,918 requires the use of several blanket layers of insulation which are then strapped around the complex pipe fitting requiring insulation. This system requires complex belting to hold the unit in place, as well as being difficult to install. U.S. Pat. No. 4,807,669 attempts to overcome these limitations by using a single body member held together with "Velcro" type fasteners, with apertures in the body for the pipes to pass therethrough. However, U.S. Pat. No. 4,807,669 has the same limitations as U.S. Pat. No. 3,941,159; that is, the device has pre-fabricated openings, which are effective only for one particular diameter pipe, or a particular diameter pipe with associated insulation wrap or pipe collar.

Additionally, some piping systems have components installed in the system which are normally encased in insulation but which components require frequent maintenance, such as a basket strainer or "Y" type strainer. Even if these type of components are insulated by the inventions described in the above patents, in order to perform maintenance on the component, the entire insulating unit must be removed.

SUMMARY OF THE INVENTION

The present invention is a removable, reusable insulating unit suitable for a variety of pipe sizes, or pipes with associated insulation. The insulating unit has a hollow body having at least two pipe receptor areas through which the pipe sections will pass. The pipe receptor areas may have indicia placed thereon to indicate a variety of pipe sizes. The insulating unit includes at least one parting line connecting at least two of the pipe receptor areas. The parting line may extend into the pipe receptor areas. The body is separable about the parting line. The unit may also have fastening members to resist separation about the parting line.

OBJECTS OF THE INVENTION

It is an object of the present invention to provide a removable reusable insulating unit which is easy to install.

It is another object of the present invention to provide a removable reusable insulating unit suitable for a variety of piping configurations.

It is another object of the present invention to provide a removable reusable insulating unit which can be installed on new piping installations, or used to retrofit existing piping installations.

It is another object of the present invention to provide a removable reusable insulating unit which can allow easy access to components of a piping system requiring maintenance without the need to remove the insulating unit.

It is another object of the present invention to provide a removable reusable insulating unit which size can be standardized to accommodate several pipe diameters.

BRIEF DESCRIPTION OF THE DRAWINGS

FIG. 1a is a prospective view of an embodiment of the present invention for a straight pipe section.

FIG. 1b is a prospective view of another embodiment of the present invention.

FIG. 1c is a prospective view of an embodiment of the present invention having an aperture for a straight pipe section.

FIG. 1d is a view of a pipe receptor area showing the indicia and cross-hair.

FIG. 3 is a prospective view of an embodiment of the present invention in a Y configuration.

FIG. 4 is a prospective view of an embodiment of the present invention in a L configuration.

FIG. 5 is a prospective view of an embodiment of the present invention in for a blind fitting.

DETAILED DESCRIPTION

Figure 2A:
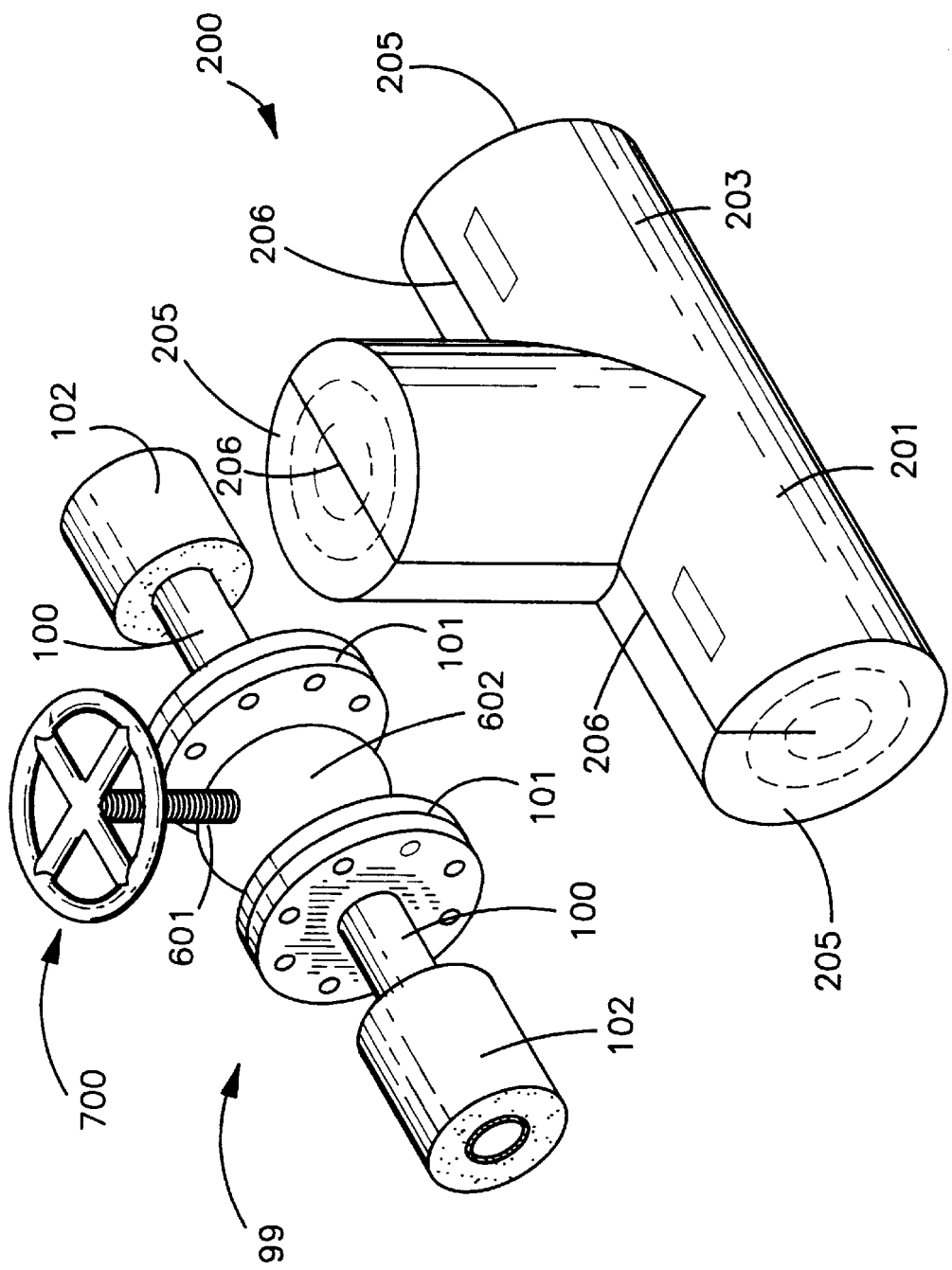
FIG. 2a is a prospective view of an embodiment of the present invention for a complex pipe system component, such as a valve.

With reference to FIG. 1a, shown is a portion of a pipe system, a pipe section 100. Pipe section 100, as shown is a pipe joint, the joint made with a flange 101. Pipe sections 100, as used in this description, are not restricted to round or oval pipes, but includes square triangular, rectangular or other shaped pipes or ducts. Pipe sections also include valves, fittings, strainers, couplings, valve stems, spigots, joints, vents, diffusers, or any other component which could be installed in a piped or ducted system and requiring insulation. For ease of illustration, but not as a restriction on the scope of the invention, the following description will focus on round pipes and with associated fittings.

Insulating wraps 102 are shown on ends of pipe section 100 adjacent to flange 101. Normally, insulating wraps 102 would also encase flange 101, but when the pipe joint requires maintenance, insulating wraps 102 must be removed from flange 101 to form an exposed area 99 of pipe section 100. Shown below pipe sections 100 is insulating unit 200, generally a cylindrical tube with closed ends. The configuration in FIG. 1a is shown partially opened. Insulating unit 200 has a hollow body 201, constructed of an insulating material 202. Insulating material may be a rigid material, such as styrofoam, urethane, glassfoam or may be a semi-rigid material, such as closed cell insulating material, like R-180-FS, manufactured by Rubatex Corporation, P. O. Box 340, Bedford, Mass., or AP Armaflex insulation, manufactured by Armstrong World Industries, P. O. Box 3001, Lancaster, Pa. Other types of insulating materials could also be used, such as woven glass fibers, or any other type of insulating materials that can be cut to shape. It is necessary that the insulating materials be easily cut in the field by an installer, such as with a knife, saw, or shears, and that the cut material retain its integrity. For instance, encased Styrofoam "pellets" would not be appropriate as once cut, the pellets would tend to disperse. It is preferable that the insulating material 202 be semi-rigid, in order to retain a pre-formed shape.

Hollow body 201 defines an exterior 203 and an interior 204. Hollow body 201 is generally substantially closed, usually having no apertures therein. For round pipe, hollow body 201 will generally be a shape created by joining, at various angles of intersection, cylindrically shape bodies. For instance, a "T", an "L", a "U" or an "X" shape can be created by intersecting cylindrically shaped bodies. The non-intersecting ends of the joined cylindrically shaped bodies will generally be closed. Interior 204 of hollow body 201 is sized to receive a pipe section 100 to be insulated. Interior 204 or exterior 203 of hollow body 201 may have a variety of material layers attached thereto, such as a vapor barrier layer, a corrosive resistant layer, or fire retardant layer. Alternatively, the insulating material itself may additionally be a vapor barrier, or corrosive resistant or fire retardant materials.

Body 201 has at least two pipe receptor areas 205 thereon, each sized to accommodate a component of the piping system 100. Pipe receptor areas 205 are portions of the body 201 where, on an installed insulating unit 200, pipe sections 100 will penetrate the body 201. For the pipe section shown in FIG. 1a, the pipe flange 101 will reside in the interior 203 of the body 201, with the pipes connected to that flange 101 passing through the body 201 at pipe receptor areas 205. Thus the term "accommodate" as used herein means that the pipe receptor area 205 is at least as large, in cross-section, as that component of the piping system intended to pass through that pipe receptor area 205.

Positioned on the body 200 is at least one parting line 206. Parting line 206 extends through the body 201 allowing the body 201 to separate along the parting line 206, thereby allowing access to the interior 204 of the insulating unit 200. Parting line 206 thus creates two mating surfaces or edges through the body 201. Parting line 206 connects at least two pipe receptor areas 205, and in general, the parting lines 206 will connect all pipe receptor areas 205. As manufactured, the insulating unit 200 may lack a parting line 206, thereby allowing the installer to cut the parting line 206 in the field.

As shown in FIG. 1a, parting line 206 may extend into pipe receptor areas 205, and, as also shown by the "L" shaped portion 600, parting line 206 may be other than a straight line. Additionally, it is not necessary that the parting line 206 create mating surfaces which about at 90 degrees. For instance, a cut through the body 201 at an angle of 45 degrees may be preferable when the sides of the body 201 adjacent to the parting line 206 might flex or might not perfectly align when installed. In these situations, a 45 degree cut through the body 201 would allow the joined parting line 206 to seal even with poor alignment of the two edges of the parting line 206. While it is desired that parting line 206 allow access to the interior of the body 201, it is not necessary that parting line 206 be cut straight through body 201, parting line 206 could form complex interlocking shapes in the body 201.

As shown in FIG. 1b, parting line 206 may extend lengthwise around the body 201, in effect, creating two separable half sections of the body 201. Such a "splitting" of the body 201 would be desirable when the insulating material is a rigid material, such as styrofoam, or where the pipe sections 100 are in an area difficult to access, or when the diameter of the pipe sections 100 are large enough to make it awkward to install a one piece insulating unit, or where the pipe sections to be joined require a split body 201, such as a cross or "X" shaped exposed pipe section, as shown by the insulating unit 200 in FIG. 1b.

Also shown in FIG. 1a are a series of indicia 207 on pipe receptor area 205. For round pipe, (as opposed to a square or rectangular pipe) indicia 207 will be a series of concentric circles indicating the diameters of various standard pipes sizes for which the insulating unit 200 is sized to fit. The indicia 207 could also be a circle which indicates the diameter of a standard pipe size plus the thickness of expected insulation wrap 102. Another view of the indicia 207 are shown in FIG. 1, which also shows cross-hair 400 for indicating the point about which the indicia 207 are centered. For ease of installation, indicia 207 may be a line of perforations to help the installer remove a portion of the pipe receptor area 205 interior to a given indicia 207.

In operation, the installer would chose the appropriate insulating unit 200 based on the configuration and size of the exposed pipe section 100 requiring insulation. The installer would then determine the diameter or cross-section of the component of the exposed pipe section, generally a pipe section, which will extent through the installed insulating unit 200. The installer would then remove a matching cross-sectional area of insulating material from the respective pipe receptor areas 205 on the insulating unit 200. The removed material will form apertures through which the pipe will pass on the installed insulating unit 200. If the insulating unit 200 has no parting line 206, the installer would then have to cut parting line 206 connecting the apertures on pipe receptor areas 205. If a parting line 206 must be cut, the installer could cut either the pipe receptor areas 205 first, then the parting line 206, or the parting line 206 first, then the pipe receptor areas 205, indeed, the installer could cut one of the pipe receptors areas 205, then the parting line 206 from the cut pipe receptor area 205 to the second pipe receptor area 205, then cut the appropriate area on the second pipe receptor area 205. Once the insulating unit 200 is cut to accommodate the components of the exposed pipe section 100 which will extend through the installed unit, the installer would open the cut insulating unit 200 along the parting line 206, placing the opened insulating unit about the exposed pipe section 100 so that the interior 203 encases the exposed pipe section 100 and the removed portions of the pipe receptor areas on the body 201 encircle the portions of the pipe system 100 extending through the installed unit 200. If fastening members 208 (to be described below) are installed on the unit, the installer would then close the fastening members to secure the unit on the pipe section. If fastening members 208 are not installed on the insulating unit 200, the installer has the option of installing the fastening members on the insulating unit in the field, usually with an adhesive. Finally, if the installer has mis-calculated and cut the apertures in the pipe receptor areas 205 too large, the installer may take a strip of insulating material or insulating tape and wrap that portion of the exposed pipe 100 section around which the mis-cut aperture is to encase, increasing the diameter of that portion of the pipe section 100 in order to accommodate the mis-cut aperture.

While not necessary, it is preferred that the installed insulating unit 200 extend beyond the exposed area 99 of pipe section 100 and overlap insulating wrap 102. Consequently, the installer will generally need to account for variations in insulation wrap 102 thickness when creating the apertures. In this fashion, each pipe receptor area 205 which is to have a pipe extending therethrough may be tailor-made to account for variations in the thickness of a given insulation wrap 102, or to account for variations in the joined pipe section sizes. For instance, one insulating unit 200 could accommodate a 6" to 4" reducing coupling: an aperture would be cut in one pipe receptor area 205 to accommodate a 4" pipe, a second aperture would be in a second pipe receptor area to accommodate the 6" pipe, and the 6" to 4" reducing coupling encased in the interior of insulating unit 200 to tailor make the proper insulating unit 200. Such versatility in the insulating unit makes it possible for a standard sized insulating unit 200 to accommodate a wide variety of piping configurations.

As shown in FIGS. 1a and 1c, insulating unit 200 may have at least one releasable fastening member 208, positionable on the body 201. Fastening member 208, when fastened, is adapted to resist separation of the body 201 along the parting line 206. For instance, fastening member 208 may be a single piece loop encircling body 201, such as a belt with which opposing ends join, such as by snap, buckle or tie, to secure parting line 206 in the closed position. Fastening member 208 may be a two piece member, the two pieces engagable with each other, with each of the two pieces attached to opposite sides of the parting line 205 (either on the exterior surface or the interior surface of the body 201, or the mating surfaces of the parting line 206) such as a two piece belting device or "Velcro" type strips. Shown in FIG. 1a is a series of fastening members 208, wherein each fastening member 208 is mating strips of hook 209 and loop 210 tapes, such as "Velcro"-type fasteners which are glued to the exterior of the body 201. Preferably, the Velcro type fasteners extends the length of the parting line 206 except for the position of the parting line 206 in the pipe receptor areas 205.

In some instances, it may be desirable to have some, but not all, of the pipe receptor area 205 apertures 300 pre-cut. For instance, as shown in FIG. 1c, an aperture 300 has been pre-cut in body 201 to accommodate valve stem 601 on valve 602. Generally, the valve stem 601 would not be insulated, and consequently, the installer does not have to account for the thickness of insulation surrounding valve stem when cutting aperture 300 for valve stem 601, making a standard sized aperture 300 feasible. If the pipes and insulating wrap do not vary substantially in diameter, it is feasible, though not preferred, to pre-cut the apertures 300 in the respective pipe receptor areas 205.

More complex shapes of insulating unit 200 are shown in FIG. 2, 3 and 4. FIG. 2 shows a "T" shaped insulating unit; FIG. 3 shows a "Y" shaped insulating unit, while FIG. 4 shows an "L" shaped insulating unit. It is apparent that other shapes are feasible, for instance a "U" shaped unit, or an "X" or cross-shaped unit as shown by the insulating unit in FIG. 1b.

Figure 2B:
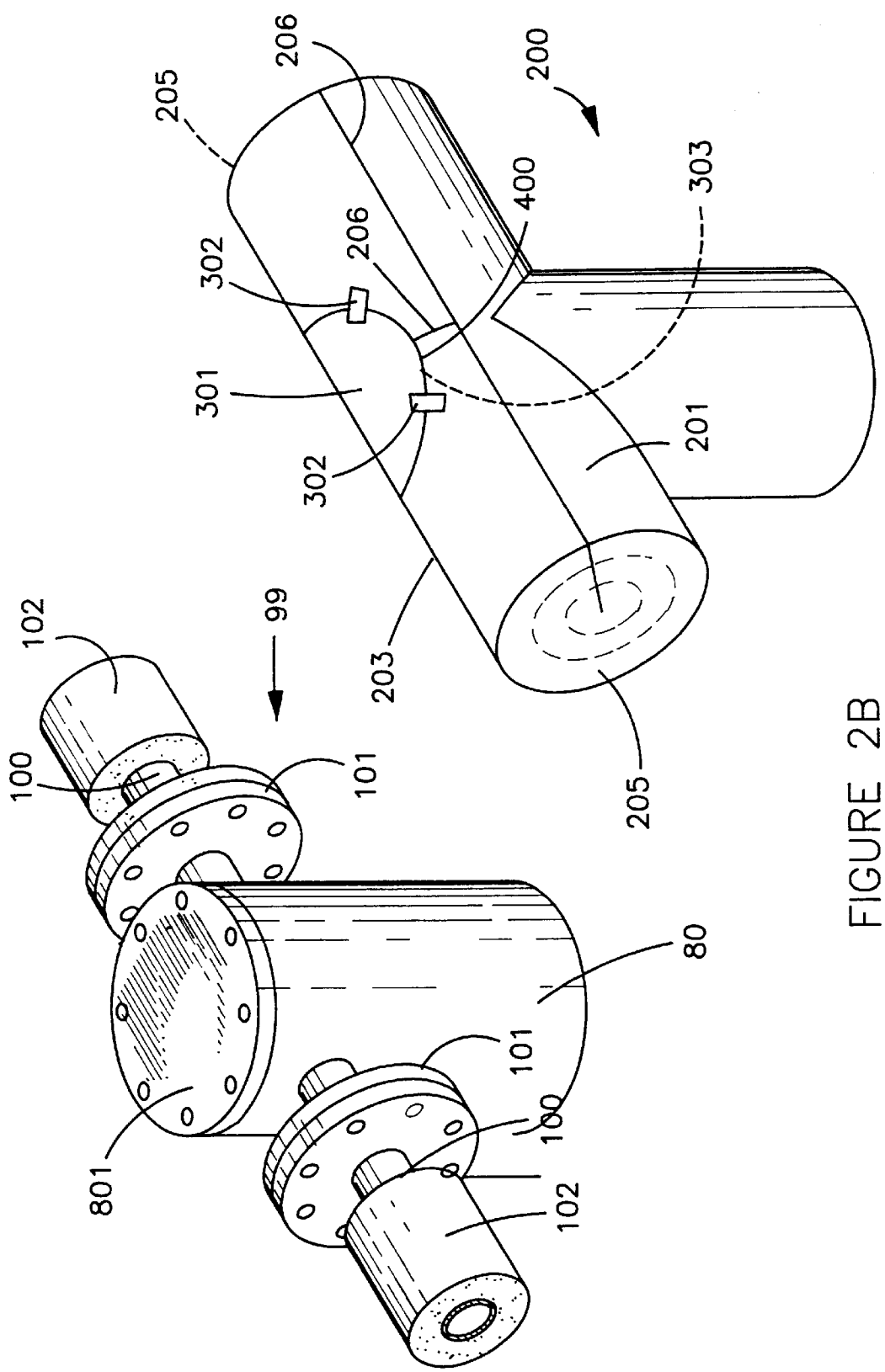
FIG. 2b is a prospective view of an embodiment of the present invention having an access opening for a complex pipe system component, such as a strainer.

The "T" shaped insulating units 200 shown in FIG. 2a and FIG. 2b have body 201 with pipe receptor areas 205. FIG. 2a is sized to accommodate a large gate valve 700, while FIG. 2b is sized to accommodate a "T" shaped basket strainer 80. Shown is parting line 206 joining pipe receptor areas 205. The valve 700 shown in FIG. 2a is similar to that shown in FIG. 1a. However, the size of the gate valve 700 in FIG. 2a makes the simple cylindrical construction of the insulating unit 200 shown in FIG. 1a unrealistic: a large cylindrically shaped body 200 requires more insulating material than the "T" shape, is awkward to work with and, when a semi-rigid insulation material is used, would not as readily maintain its shape when installed as would a smaller "T" shaped body, but will tend to deform about the valve, possibly creating un-insulated gaps in the parting line 206.

The insulating unit 200 shown in FIG. 2b additionally has an access opening 303 through body 201. Access opening 303 has a removable insulating cover 301 for closing the access opening 303. Access opening 303 and insulating cover 301 allow easy access to strainer cover 801 for maintenance purposes without the need to remove the entire insulating unit 200. Insulated unit 200 may include a closing device 302, for maintaining the cover 301 in closed relationship with access opening. For instance, closing device may be engagable "Velcro"-type strips, one strips being glued the exterior of body 201 and the engaging strip being glued to cover 301. Other closing devices 302 are feasible, as is for the fastening members 208. For instance, if the fit between the access opening 303 and cover 302 is of sufficiently close tolerance, closing device 302 is simply a compression fit. Access opening 303, cover 301, and closing device 302 may be pre-fabricated, or created at the job-site.

As shown in FIG. 2b, a portion 400 of parting line 206 coincides with access opening 303. However it is not necessary that access opening 303 be connected with parting line 206. If on-site installation of an access opening 303 is anticipated, parting line 206 could alternatively be routed across body 201 to avoid intersection with an anticipated access opening 303. It is also possible that a pipe receptor area 205 could be used for an access opening 303.

Shown in FIG. 3 and FIG. 4 are "Y" and "L" shaped insulating units 200 with body 201 having pipe receptor areas 205. Shown is parting line 206 joining pipe receptor areas 205. Also shown are fastening members 208, shown as a series of mating strips of hook and loop tapes. Finally, FIG. 5 shows an insulating unit 200 for a blind or terminal fitting 500. In this instance, hollow body 201 has a single pipe receptor area 205, without a parting line 206. It may be desirable for this insulating unit to have an access slit 501 through body and joined with the pipe receptor area 205. The access slit 501 allows the insulating unit (if constructed of semi-rigid materials) to "flex" or deform, thereby allowing the insulating unit 200 to be easily installed around terminal fitting 500. The access slit 501 may extend around body 201 in order to allow body 201 to split open for easy installation and when the insulating unit 200 is constructed of rigid materials, this is preferred.

I claim:

1. A removable reusable insulating unit suitable for insulating exposed pipe sections with portions of the pipe section to extend through an installed said insulating unit, the pipe sections forming components of an insulated pipe system, said insulating unit comprising a one piece construction closed hollow body constructed of a semi-rigid insulating material, said insulating material being capable of being easily cut, said hollow unitary body defining an interior and an exterior of said insulating unit, said interior sized to envelop an exposed pipe section on an insulated pipe system; said body having at least two closed pipe receptor areas, each of said pipe receptor areas sized to accommodate a component of an insulated pipe system so that when installed, at least one component will extend through at least two of said pipe receptor areas.

2. An insulating unit according to claim 1 further having at least one parting line through said body, said parting line connecting at least two of said pipe receptor areas of said body, said parting line being adapted so that said body is separable along said parting line.

3. An insulating unit according to claim 2 having more than two pipe receptor areas wherein some, but not all, of said pipe receptor areas have an aperture therethrough, said aperture sized to receive a component of an insulated pipe system.

4. An insulating unit according to claim 2 wherein said body has an access opening therethrough, allowing access to said interior, said access opening having a cover for closing said access opening and a closing member to retain said cover in a closed relationship with said access opening.

5. An insulating unit according to claim 2 wherein said insulating materials are constructed of closed cell materials.

6. An insulating unit according to claim 2 further having at least one releasable fastening member positionable on said body and adapted so that when said releasable fastening member is fastened, said body will resist separation along said parting line.

7. An insulating unit according to claim 6 wherein said releasable fastening member is at least one mating strip of hook and loop tape fasteners, said mating strip of hook and loop tape fasteners disposed on the exterior of said body and positioned adjacent to said parting line so as to bridge across and close said parting line.

8. An insulating unit according to claim 2 wherein said body is cylindrically shaped.

9. An insulating unit according to claim 2 wherein said body is Y-shaped.

10. An insulating unit according to claim 2 wherein said body section is L-shaped.

11. An insulating unit according to claim 2 wherein said body section is T-shaped.

12. An insulating unit according to claim 2 wherein at least one of said pipe receptor areas further has at least one indicia placed thereon for indicating the cross-section of a predetermined pipe section.

13. An insulating unit according to claim 12 wherein said indicia form a line of perforations into said pipe receptor area, said line of perforations forming a closed loop defining an area interior to said closed loop, said perforations adapted to assist in removing that portion of said pipe receptor area interior to said closed loop.

14. A removable reusable insulating unit suitable for insulating exposed terminal pipe sections of an insulated pipe system, said insulating unit comprising a one piece construction hollow body constructed of a semi-rigid insulating material, said insulating material capable of being easily cut, said hollow body defining an interior and an exterior of said insulating unit, said interior sized to envelop an exposed pipe section on an insulated pipe system, said body having one closed pipe receptor areas, said pipe receptor areas sized to accommodate a component of an insulated pipe system.

15. A method of insulating an exposed pipe section with a removable insulating unit, comprising the steps of (1) measuring the exposed pipe section to determine the configuration and dimensions of an insulating unit suitable for insulating said exposed pipe section; (2) providing a removable reusable insulating unit comprising a one piece construction hollow body constructed of a semi-rigid insulating material, said insulating material capable of being easily cut, said hollow body defining an interior and an exterior of said insulating unit, said interior sized to envelop the exposed pipe section on an insulated pipe system with portions of the pipe section to extend through an installed said insulating unit, said body having at least two closed pipe receptor areas, each of said closed pipe receptor areas sized to accommodate a component of an insulated pipe system which will extend through said pipe receptor areas, said insulating unit further having at least one parting line through said body, said parting line connecting at least two of said pipe receptor areas of said body, said parting line being adapted so that said body is separable along said parting line; (3) cutting said closed pipe receptor areas in a fashion to remove a portion of said body to accommodate the portions of the pipe section which will extend through said installed insulating unit; (4) removing said cut portions of said pipe receptor areas; (5) opening said insulating unit along said parting line; (6) placing said opened insulating unit about said exposed pipe section so that said interior encases said exposed pipe section and said removed portions of said body encircle said portions of said pipe system extending through said installed unit.

16. A method according to claim 15, wherein said insulating unit further has a one releasable fastening member positionable on said body and adapted so that when said releasable fastening member is fastened, said body will resist separation along said parting line, and the method further comprises the step of (6) fastening said releasable fastening member to secure said insulating unit around said exposed pipe section.

* * * * *